US009137829B2

(12) United States Patent
Lee et al.

(10) Patent No.: US 9,137,829 B2
(45) Date of Patent: Sep. 15, 2015

(54) CELL RESELECTION METHOD FOR INCREASING RANDOM ACCESS SUCCESS RATE IN WIRELESS ACCESS SYSTEM

(75) Inventors: Songgun Lee, Anyang-si (KR); Sunhee Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 14/111,492

(22) PCT Filed: Apr. 13, 2012

(86) PCT No.: PCT/KR2012/002811
§ 371 (c)(1),
(2), (4) Date: Jan. 22, 2014

(87) PCT Pub. No.: WO2012/141524
PCT Pub. Date: Oct. 18, 2012

(65) Prior Publication Data
US 2014/0162646 A1 Jun. 12, 2014

(30) Foreign Application Priority Data
Apr. 13, 2011 (KR) .......................... 10-2011-0034187

(51) Int. Cl.
*H04W 74/08* (2009.01)
*H04W 48/20* (2009.01)
(52) U.S. Cl.
CPC .......... *H04W 74/0833* (2013.01); *H04W 48/20* (2013.01)
(58) Field of Classification Search
None
See application file for complete search history.

(56) References Cited

U.S. PATENT DOCUMENTS

| 6,751,472 | B1 * | 6/2004 | Muhonen ................... 455/553.1 |
| 6,792,284 | B1 * | 9/2004 | Dalsgaard et al. ............ 455/525 |
| 7,266,381 | B2 * | 9/2007 | Charles ....................... 455/456.4 |
| 8,064,383 | B2 * | 11/2011 | Koo et al. ...................... 370/328 |
| 8,265,035 | B2 * | 9/2012 | Du et al. ........................ 370/331 |
| 2007/0004445 | A1 * | 1/2007 | Dorsey et al. .................. 455/525 |

(Continued)

FOREIGN PATENT DOCUMENTS

| KR | 1020080068994 | 7/2008 |
| KR | 1020080075292 | 8/2008 |

(Continued)

OTHER PUBLICATIONS

3rd Generation Partnership Project, "Technical Specification Group Radio Access Network: Evolved Universal Terrestrial Radio Access (E-UTRA); Radio Resource Control (RRC); Protocol specification (Release 8)", 3GPP TS 36.331 V8.13.0, Mar. 2011, 213 pages (relevant pp. 31-36).

(Continued)

*Primary Examiner* — Ashish K Thomas
(74) *Attorney, Agent, or Firm* — Lee, Hong, Degerman, Kang & Waimey (57) ABSTRACT

The present invention relates to a wireless access system, and more specifically to a method for efficiently performing a cell reselection and an apparatus for performing the same when a terminal fails in a random access. The method for enabling user equipment to reselect cells in the wireless access system according to one embodiment of the present invention, comprises the steps of: starting a random access procedure for a first cell selected according to a first condition; and performing a cell reselection procedure according to a second condition if the random access procedure is not successfully completed before a timer set from the starting step expires.

6 Claims, 8 Drawing Sheets

(56) References Cited

U.S. PATENT DOCUMENTS

| | | | |
|---|---|---|---|
| 2008/0176563 A1* | 7/2008 | Lee et al. | 455/435.2 |
| 2009/0247161 A1* | 10/2009 | Pani et al. | 455/435.3 |
| 2009/0270104 A1* | 10/2009 | Du et al. | 455/436 |
| 2010/0178920 A1* | 7/2010 | Kitazoe et al. | 455/436 |
| 2011/0096671 A1* | 4/2011 | Lindstrom et al. | 370/242 |
| 2012/0270540 A1* | 10/2012 | Ode et al. | 455/426.1 |
| 2013/0183973 A1* | 7/2013 | Amerga et al. | 455/436 |
| 2013/0215848 A1* | 8/2013 | Kato et al. | 370/329 |
| 2013/0344911 A1* | 12/2013 | Yu | 455/521 |

FOREIGN PATENT DOCUMENTS

| | | |
|---|---|---|
| KR | 1020080095260 | 10/2008 |
| KR | 1020090033238 | 4/2009 |

OTHER PUBLICATIONS

PCT International Application No. PCT/KR2012/002811, Written Opinion of the International Searching Authority dated Nov. 26, 2012, 17 pages.

* cited by examiner

CELL RESELECTION METHOD FOR INCREASING RANDOM ACCESS SUCCESS RATE IN WIRELESS ACCESS SYSTEM

CROSS-REFERENCE TO RELATED APPLICATIONS

This application is the National Stage filing under 35 U.S.C. 371 of International Application No. PCT/KR2012/002811, filed on Apr. 13, 2012, which claims the benefit of earlier filing date and right of priority to Korean Application No. 10-2011-0034187, filed on Apr. 13, 2011, the contents of which are hereby incorporated by reference herein in their entirety.

TECHNICAL FIELD

The present invention relates to a wireless access system, and more particularly, to a method of efficiently performing a cell reselection performed by a user equipment when the user equipment fails in a random access and an apparatus therefor.

BACKGROUND ART

In a mobile communication system, a user equipment can receive information from a base station in downlink and the user equipment can transmit information in uplink. The user equipment performs a random access procedure to establish a connection with a network.

More specifically, if a power of a user equipment is turned on again from a state of power-off or the user equipment newly enters a cell, the user equipment performs an initial cell search job for matching synchronization with a base station and the like. Having completed the cell search, the user equipment initiates a random access procedure in a manner of selecting a cell from identified base stations. As the random access procedure is initiated, a timer (e.g., T300 timer), which has defined a limit time for completing the random access procedure, can be initiated as well. If the random access procedure is not completed until the timer expires, the user equipment performs a cell reselection. In case of performing the cell reselection, the user equipment takes into account signal quality of each cell. A representative example of the signal quality may include reference signal reception power (RSRP) or signal-to-noise ratio (SNR) of each cell.

In case of performing a cell reselection, a general LTE (long term evolution) system defines that a more weighting is given to the RSRP of a cell currently accessed by a user equipment or a cell attempts to be accessed by the user equipment (hereinafter called 'serving cell' for clarity) and a handicap is given to the RSRP of a surrounding cell. This is intended to prevent the user equipment from frequently moving (ping pong) between cells.

Yet, although signal quality of a surrounding cell is better than that of a serving cell, if it does not offset the weighting given to the serving cell and the handicap given to the surrounding cell, the user equipment continuously stays at the serving cell. In case of performing a random access procedure in the serving cell to enter a network, because a cell reselection condition is not satisfied despite the signal quality of the surrounding cell is better than that of the serving cell, the signal quality of the serving cell is more degraded by interference of the surrounding cell and the random access procedure cannot be successfully performed. Consequently, if the random access procedure performed in serving cell is continuously failed, the cell reselection for a superior cell may become harder for the user equipment to perform since the cell reselection condition is limited.

DISCLOSURE OF THE INVENTION

Technical Tasks

Accordingly, the present invention is directed to substantially obviate one or more problems due to limitations and disadvantages of the related art. First of all, one object of the present invention is to propose a more efficient cell reselection condition.

Another object of the present invention is to provide a method of enhancing a random access success rate in case of performing a cell reselection when a user equipment fails in a random access procedure to a current cell and an apparatus therefor.

Technical tasks obtainable from the present invention are non-limited the above-mentioned technical task. And, other unmentioned technical tasks can be clearly understood from the following description by those having ordinary skill in the technical field to which the present invention pertains

Technical Solution

To achieve these and other advantages and in accordance with the purpose of the present invention, as embodied and broadly described, according to one embodiment, a method of performing a cell reselection, which is performed by a user equipment in a wireless access system include the steps of initiating a random access procedure to a first cell selected according to a first condition and if the random access procedure is not successfully completed until a timer, which has started in the initiating step, expires, performing a cell reselection according to a second condition.

To further achieve these and other advantages and in accordance with the purpose of the present invention, according to one embodiment, a user equipment performing a cell reselection in a wireless access system includes a processor and a radio communication (RF) module configured to transceive a radio signal with an external according to a control of the processor, the processor configured to initiate a random access procedure to a first cell selected according to a first condition, if the random access procedure is not successfully completed until a timer, which has started in the initiating step, expires, the processor configured to perform a cell reselection according to a second condition.

The first condition may correspond to giving a prescribed weighting on signal quality of a serving cell currently connected or the serving cell attempts to be connect to the user equipment and giving a prescribed penalty on each signal quality of at least one surrounding cell.

The second condition may correspond to modifying at least one value among the weighting given to the signal quality of the serving cell and the penalty given to each signal quality of the at least one surrounding cell.

In particular, a value of the modified weighting and a value of the modified penalty may correspond to 0.

Preferably, the timer may correspond to a T300 timer, which has defined a limit time for completing the random access procedure.

Advantageous Effects

Accordingly, the present invention provides the following effects or advantages.

First of all, a more efficient cell reselection condition can be defined by using embodiments of the present invention.

Secondly, a user equipment can select a surrounding cell excellent in signal quality in case of performing a cell reselection when the user equipment fails in a random access attempt in a current cell by using embodiments of the present invention and success rate of the random access attempt can be enhanced.

Effects obtainable from the present invention are non-limited by the above mentioned effect. And, other unmentioned effects can be clearly understood from the following description by those having ordinary skill in the technical field to which the present invention pertains.

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, they are applicable to other random mobile communication systems except unique features of the 3GPP LTE system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS) and the like. And, assume that a base station is a common name of such a random node of a network stage communicating with a terminal as a node B, an eNode B, a base station, and the like.

In a mobile communication system, a user equipment is able to receive information in downlink (DL) from a base station. And, the user equipment is able to transmit information in uplink (UL) as well. Informations transmitted or received by the user equipment include data and various kinds of control informations. And, various kinds of physical channels exist in accordance with types and usages of the informations transmitted or received by the user equipment.

Figure 1:
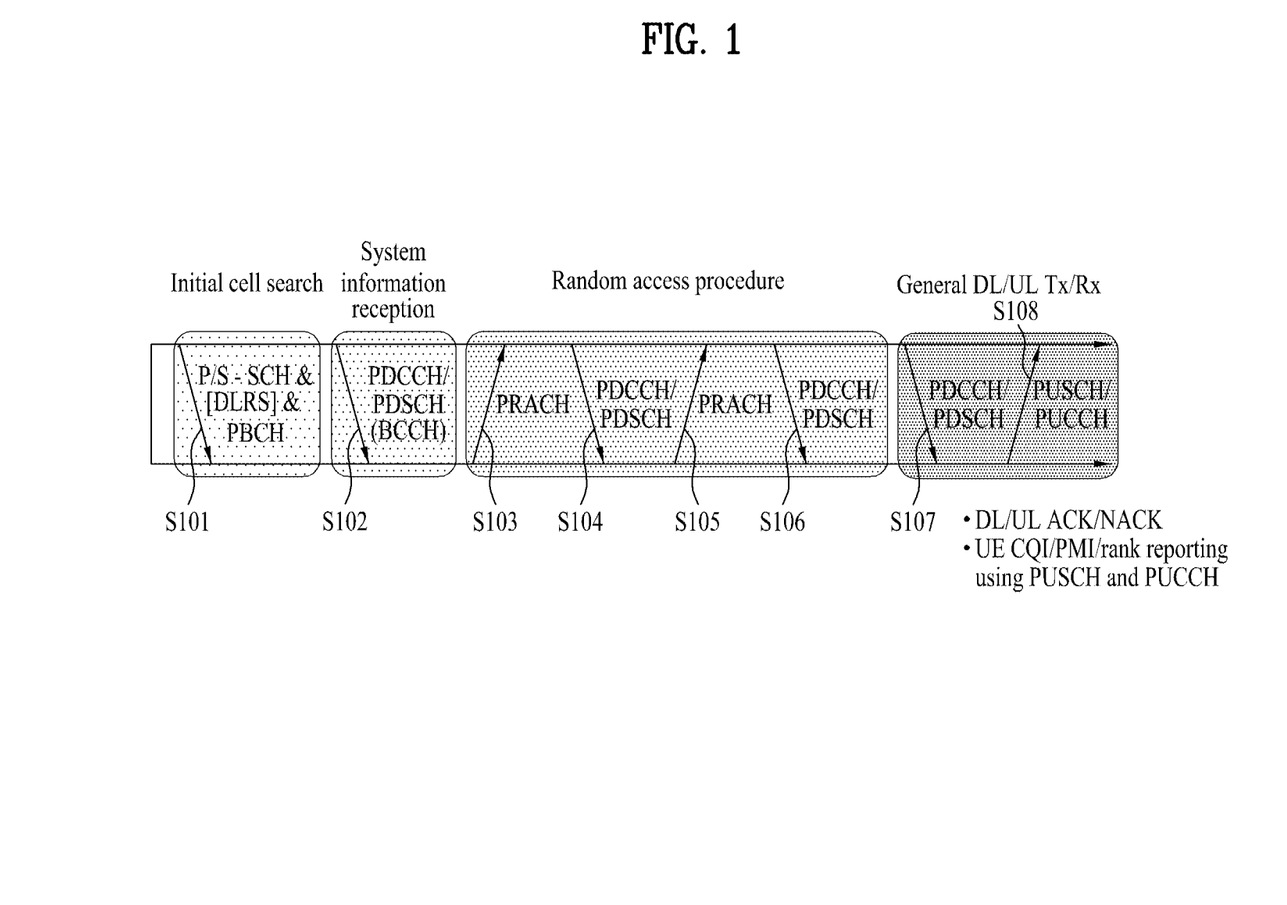
FIG. 1 is a diagram for explaining physical channels used for 3GPP ($3^{rd}$ generation partnership project) LTE (long term evolution) system and a method of a signal transmission using the same.

FIG. 1 is a diagram for explaining physical channels used for 3GPP ($3^{rd}$ generation partnership project) LTE (long term evolution) system and a method of a signal transmission using the same.

If a power of a user equipment is turned on again from a state of power-off or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may be then able to obtain information such as a cell ID and the like. Subsequently, the user equipment may receive a physical broadcast channel from the base station and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink control channel (PD-CCH) and a physical downlink shared control channel (PD-SCH) according to the physical downlink control channel (PDCCH) and may be then able to obtain detailed system information [S102].

Meanwhile, in case of initially accessing the base station or if there is no radio resource to transmit a signal, the user equipment can perform a random access procedure to the base station [S103 to S106]. To this end, the user equipment transmits a specific sequence as a preamble on a physical random access channel (PRACH) [S103] and may be then able to receive a response message on PDCCH and PDSCH corresponding to PDCCH in response to the random access [S104]. In case of a contention based random access except a handover case, it may be able to perform a contention resolution procedure such as physical uplink shared channel [S105] and reception [S106] of a physical downlink control channel/physical downlink shared channel.

Having performed the above mentioned procedures, the user equipment may be able to perform a physical downlink control channel/physical downlink shared channel reception [S107] and a PUSCH/PUCCH (physical uplink shared channel/physical uplink control channel) transmission [S108] as a general uplink/downlink signal transmission procedure. In this case, control information transmitted to the base station in UL by the user equipment or the control information received from the base station in DL by the user equipment may include a DL/UL ACK/NACK signal, a CQI (channel quality indicator), a PMI (precoding matrix index), an RI (rank indicator), and the like. In case of 3GPP ($3^{rd}$ generation partnership project) LTE (long term evolution) system, the user equipment can transmit such control information as the CQI, the PMI, the RI, and the like on physical uplink shared channel and/or physical uplink control channel.

In case of 3GPP LTE system, a signal processing process to transmit a UL/DL signal is explained in the following description.

Figure 2:
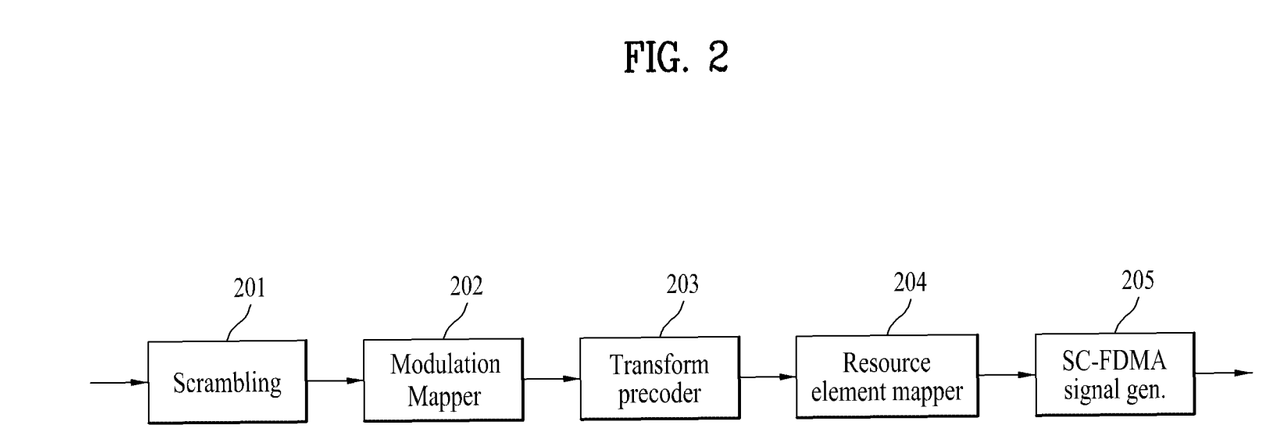
FIG. 2 is a diagram for describing a signal processing process for a user equipment to transmit a UL signal.

FIG. 2 is a diagram for describing a signal processing process for a user equipment to transmit a UL signal.

First of all, in order to transmit a UL signal, a scrambling module 210 of a user equipment may be able to scramble a transmission signal using a UE-specific scrambling signal. This scrambled signal is inputted to a modulating mapper 220 and is then modulated into a complex symbol by BPSK (binary phase shift keying), QPSK (quadrature phase shift keying) or 16 QAM (quadrature amplitude modulation) scheme in accordance with a type and/or channel state of the transmission signal. Subsequently, the modulated complex symbol is processed by a transform precoder 230 and is then inputted to a resource element mapper 240. In this case, the resource element mapper 240 may be able to map the complex symbol to a time-frequency resource element, which is to be used for a practical transmission. This processed signal is inputted to an SC-FDMA signal generator 250 and may be then transmitted to a base station via an antenna.

Figure 3:
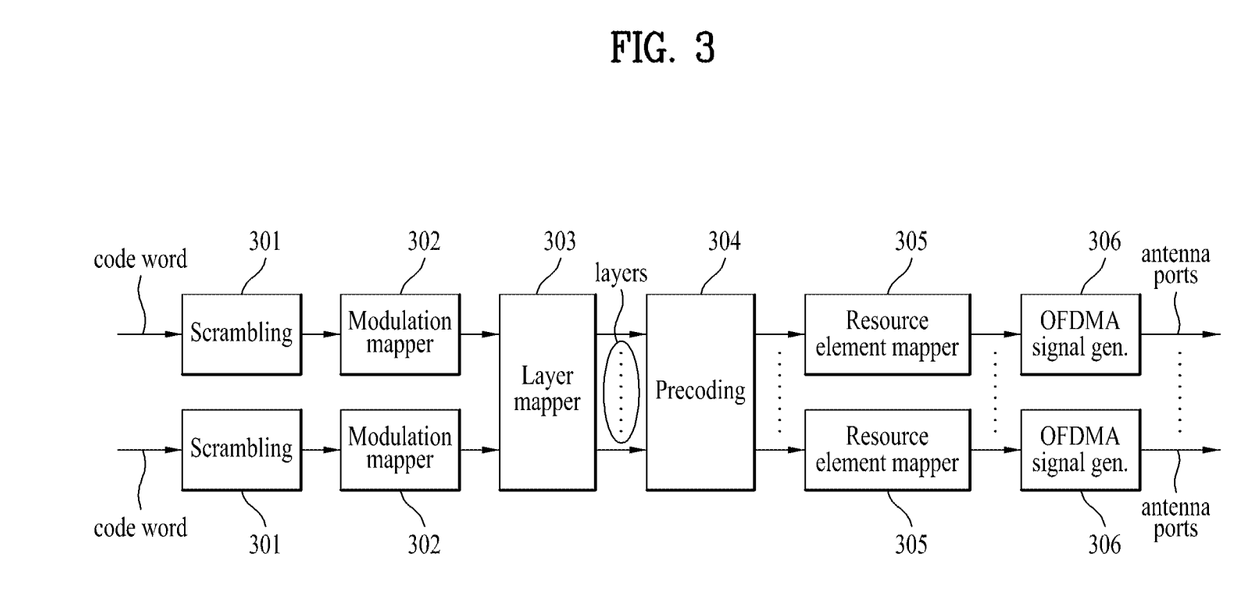
FIG. 3 is a diagram for describing a signal processing process for a base station to transmit a DL signal.

FIG. 3 is a diagram for describing a signal processing process for a base station to transmit a DL signal.

In 3GPP LTE system, a base station can transmit at least one codeword in DL. Hence, similar to the UL depicted in FIG. 2, each of the at least one codeword can be processed into a complex symbol by a scrambling module 301 and a modulating mapper 302. Subsequently, the complex symbol is mapped to a plurality of layers by a layer mapper 303. Each of a plurality of the layers may be then assigned to each transmitting antenna by being multiplied by a prescribed precoding matrix selected by a precoding module 304 in accordance with a channel state. A transmission signal per each antenna processed by the above mentioned manner is mapped to a time-frequency resource element by each resource element mapper 305, is inputted to an OFDM signal generator 306, and may be then transmitted via a corresponding antenna.

In the following description, a random access procedure provided by LTE system is schematically described based on the aforementioned explanation.

First of all, a user equipment may be able to perform a random access procedure in one of the following cases.

The user equipment performs an initial access without a connection (e.g., RRC connection) with a base station.

The user equipment initially accesses a target cell in a handover procedure.

The random access procedure is requested by a command from a base station.

In a situation that time synchronization of uplink is not matched or that a designated radio resource used to request a radio resource is not allocated, data in uplink is generated.

A recovery procedure is performed in case of radio link failure or handover failure.

In LTE system, in a process for selecting a random access preamble, there are a contention based random access procedure for a user equipment to select and use a random one preamble from a specific set and a non-contention based random access procedure for using a random access preamble assigned to a specific user equipment by a base station only. Besides, the non-contention based random access procedure is usable only in the aforementioned handover procedure or only if requested by the command from the base station.

Meanwhile, a process of performing a random access with a specific base station by a user equipment may mainly include (1) a step of transmitting a random access preamble to a base station by a user equipment (hereinafter, if there is no confusion, 'first message (message 1)' transmission step), (2) a step of receiving a random access response from the base station in response to the transmitted random access preamble (hereinafter, if there is no confusion, 'second message (message 2)' reception step), (3) a step of transmitting a UL message using information received from a random access response message (hereinafter, if there is no confusion, 'third message (message 3)' transmission step, and (4) a step of receiving a message corresponding to the UL message from the base station (hereinafter, if there is no confusion, 'fourth message (message 4)' reception step).

Figure 4:
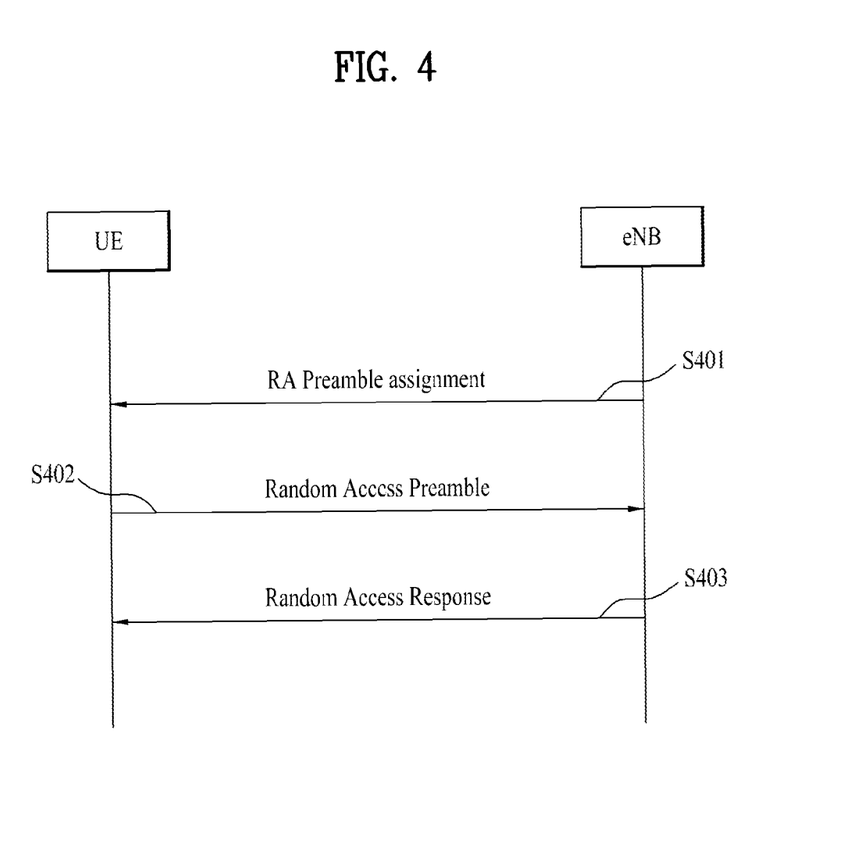
FIG. 4 is a flowchart for describing an operating process between a user equipment and a base station in a non-contention based random access procedure.

FIG. 4 is a flowchart for describing an operating process between a user equipment and a base station in a non-contention based random access procedure.

(1) Random Access Preamble Assignment

As mentioned in the foregoing description, a non-contention based random access procedure may be performed (1) in case of a handover procedure or (2) in case of being requested by a command from a base station. Of course, a contention based random access procedure may be performed in both of the above-mentioned cases.

First of all, for the non-contention based random access procedure, it is important to receive a designated random access preamble, which has no possibility of collision, from a base station. The random access preamble may be indicated by a base station via a handover command or a PDCCH command. By doing so, the random access preamble is assigned to a user equipment [S401].

(2) $1^{st}$ Message Transmission

As mentioned in the foregoing description, after the random access preamble designated to the user equipment only is assigned to the user equipment, the user equipment transmits the preamble to a base station [S402].

(3) $2^{nd}$ Message Reception

After the user equipment has transmitted the random access preamble in the step S402, the user equipment attempts a reception of its random access response in a random access response receiving window indicated by a base station through the system information or the handover command [S403]. In particular, the random access response information may be transmitted in format of MAC PDU. And, the MAC PDU may be carried on PDSCH (physical downlink shared channel). In order to receive the information carried on the PDSCH, the user equipment preferably monitors PDCCH (physical downlink control channel). In particular, information on a user equipment necessary to receive the PDSCH, a frequency and time information of a radio resource of the PDSCH, a transmission format of the PDSCH and the like may be preferably included in the PDCCH. Once the user equipment succeeds in the reception of the PDCCH transmitted to the user equipment, it may be able to appropriately receive a random access response carried on the PDSCH in accordance with the informations of the PDCCH. And, a random access preamble identifier (ID) (e.g., RAPID (random access preamble identifier), a UL grant indicating a UL radio resource, a temporary cell identifier (temporary C-RNTI), time synchronization correction value (timing advance command (TAC)) and the like can be included in the random access response.

As mentioned in the foregoing description, the random access preamble identifier is required for the random access response. Since random access response information for at least one or more user equipments may be included in one random access preamble, it may be necessary to indicate the UL grant, the temporary cell identifier and the TAC are valid for which user equipment. In this step, assume that the user equipment selects a random access preamble identifier matching the random access preamble selected by the user equipment in the step S402.

In the non-contention based random access procedure, it may be able to judge that a random access procedure is normally performed in a manner of receiving the random access response information and may end the random access procedure.

Figure 5:
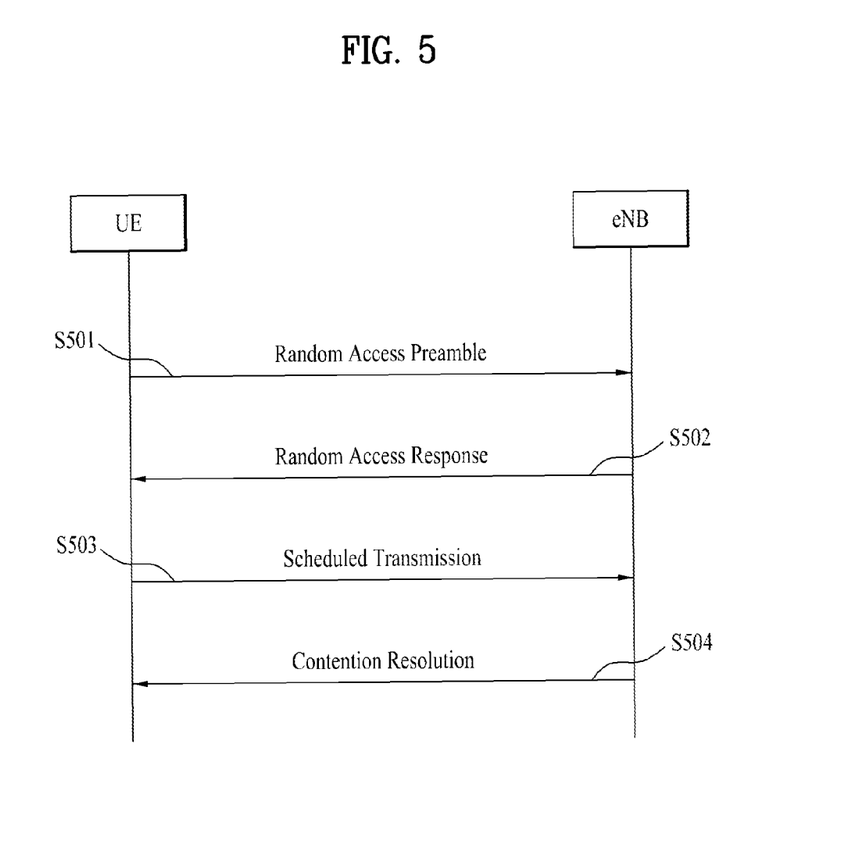
FIG. 5 is a flowchart for describing an operating process between a user equipment and a base station in a contention based random access procedure.

FIG. 5 is a flowchart for describing an operating process between a user equipment and a base station in a contention based random access procedure.

(1) 1st Message Transmission

First of all, a user equipment randomly selects a random access preamble from a set of random access preambles indicated by system information or a handover command, selects a PRACH (physical RACH) resource for carrying the random access preamble, and then transmits the random access preamble via the selected PRACH resource [S501].

(2) 2nd Message Reception

A method of receiving random access response information is identical to a method in a non-contention based random access procedure. In particular, similar to the step S401, after the user equipment has transmitted the random access preamble, the user equipment attempts a reception of its random access response in a random access response receiving window indicated by a base station through the system information or the handover command and receives PDSCH via corresponding RA-RNTI information [S402]. By doing so, the user equipment can receive a UL grant, a temporary cell identifier (temporary C-RNTI), time synchronization correction value (timing advance command (TAC)) and the like.

(3) 3rd Message Reception

If the user equipment receives the random access response valid for the user equipment, it may process the informations included in the random access response. In particular, the user equipment applies the TAC and saves the temporary cell identifier. Moreover, the user equipment transmits a data (i.e., a 3rd message) to a base station using a UL grant [S403]. The 3rd message should include an identifier of the user equipment. In the contention based random access procedure, a base station is unable to determine which user equipments perform the random access procedure. In order to resolve the contention later, the base station needs to identify a user equipment.

As a method of including an identifier of a user equipment, two kinds of methods have been discussed. According to a 1st method, if a user equipment has a valid cell identifier already allocated by a corresponding cell prior to the random access procedure, the user equipment transmits its cell identifier via UL transmission signal corresponding to the UL grant. On the contrary, if the user equipment fails to receive the allocation of a valid cell identifier prior to the random access procedure, the user equipment transmits its unique identifier (e.g., S-TMSI, random ID (Random Id), etc.). In general, the unique identifier is longer than the cell identifier. If the user equipment transmits data corresponding to the UL grant, the user equipment initiates a contention resolution timer.

(4) 4th Message Reception

After the user equipment has transmitted the data including its identifier via the UL grant included in the random access response, the user equipment waits for an instruction from the base station for the contention resolution. In particular, the user equipment may attempt a reception of PDCCH to receive a specific message [S404]. As a method of receiving the PDCCH, two kinds of methods have been discussed. As mentioned in the foregoing description, if the 3rd message transmitted in response to the UL grant uses a cell identifier as its identifier, the user equipment attempts a reception of PDCCH using its cell identifier. If the identifier is a unique identifier, the user equipment may be able to attempt a reception of PDCCH using a temporary cell identifier included in the random access response. Thereafter, in the former case, if the PDCCH is received via its cell identifier before expiration of the contention resolution timer, the user equipment determines that the random access procedure is normally performed and then ends the random access procedure. In the latter case, if PDCCH is received via a temporary cell identifier before expiration of the contention resolution timer, the user equipment checks data carried on PDSCH indicated by the PDCCH. If the unique identifier of the user equipment is included in a content of the data, the user equipment determines that the random access procedure is normally performed and then ends the random access procedure.

Meanwhile, in LTE system, a timer is triggered when a random access procedure is initiated in a user equipment and the timer defines a limit time of the random access procedure. If a random access procedure is not completed until the T300 timer expires, the user equipment performs a cell reselection. The random access procedure explained with reference to FIG. 4 and FIG. 5 is explained again with reference to FIG. 6 in relation to the T300 timer.

Figure 6:
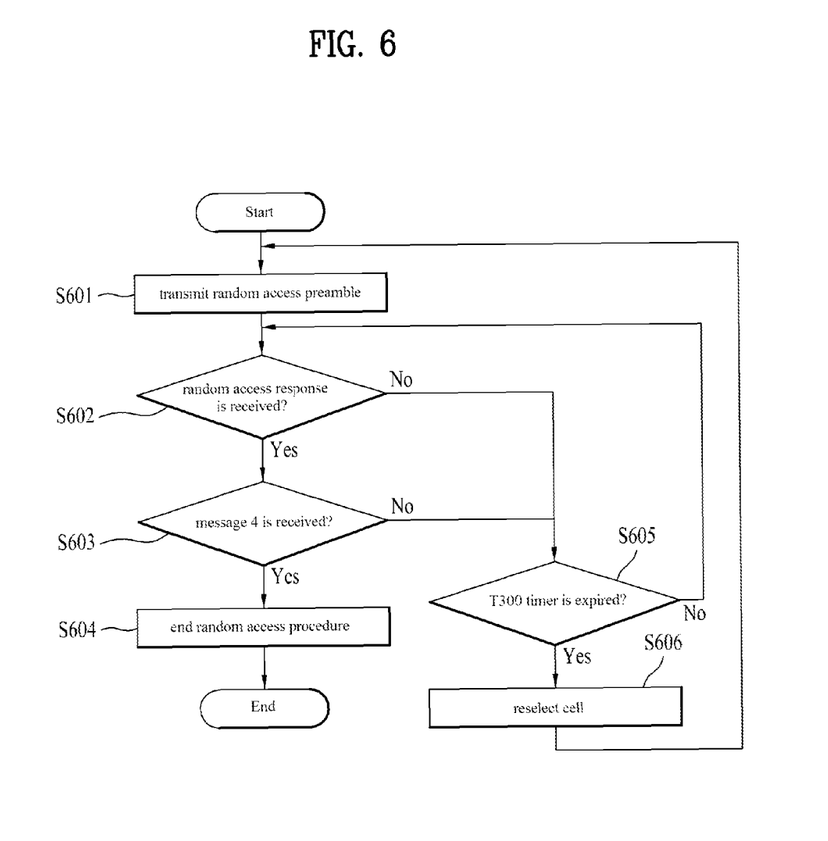
FIG. 6 indicates an example of a random access procedure when a T300 timer is taken into account in a user equipment.

FIG. 6 indicates an example of a random access procedure when a T300 timer is taken into account in a user equipment.

Assume a procedure depicted in FIG. 6 is a procedure after a cell is selected in accordance with cell selection criteria defined by a general LTE system. The cell selection criteria defined by a general LTE system, in particular, a rank of cell is calculated by Formula 1 as follows.

$$Rs = Q\text{meas},s + Q\text{hyst}$$

$$Rn = Q\text{meas},n - Q\text{offset} \qquad \text{[Formula 1]}$$

Referring to Formula 1, Qmeas indicates an RSRP measurement result, s means a serving cell, and n means a neighbor cell. And, Qhyst and Qoffset are constant numbers. Hence, if Formula 1 is explained again, calculation on a rank (Rs) of a serving cell is to give a weighting on an RSRP measurement result (Qmeas, s) of the serving cell as much as Qhyst and calculation on a rank (Rn) of a neighbor cell is to give a handicap (or, a penalty) on an RSRP measurement result (Qmeas, n) of the neighbor cell as much as Qoffset. If the rank of the neighbor cell is maintained higher than that of the serving cell as much as Treselection time in the rank calculated by the Formula 1, a user equipment selects a surrounding cell. In this case, such a parameter as the Treselection, the Qhyst, the Qoffset, and the like uses a value determined by a network.

If a cell is selected according to the criteria such as the Formula 1, a user equipment initiates a T300 timer and transmits a random access preamble to the selected cell [S601].

If a random access response is received from a base station in response to the transmitted random access preamble [S602], the user equipment transmits a message 3 and waits for a message 4 [S603].

If the message 4 is received before the T300 timer expires, a random access procedure successfully ends [S604].

Yet, if the random access response or the message 4 is not received until the T300 timer expires [S605], the user equipment performs a cell reselection in a manner of going back to an idle state [S606] and attempts a random access to the selected cell again.

Yet, since a condition of a cell reselection in the step S606 is identical to a condition of a cell reselection prior to the step S601, although signal quality of a surrounding cell is better than that of a serving cell, if the signal quality of the surrounding cell does not offset a weighting given to the serving cell and a penalty given to the surrounding cell, the user equipment continuously stays at the serving cell. Hence, the serving cell attempts a random access to the serving cell again.

Yet, a success rate of the random access to the serving cell is lower than that of the random access to the surrounding cell.

Hence, one embodiment of the present invention proposes to change a method of calculating a rank of a cell to enhance a success rate of a cell reselection in case of performing the cell reselection after a user equipment fails in a random access. An example for a process of performing a random access procedure in a manner of changing a rank calculation according to one embodiment of the present invention is explained with reference to FIG. 7.

Figure 7:
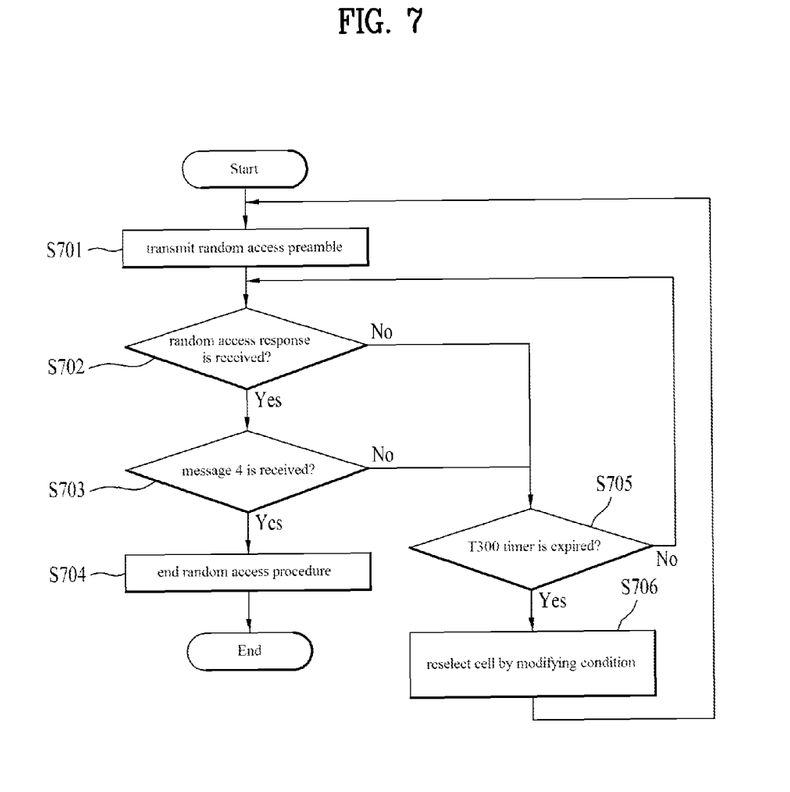
FIG. 7 indicates an example of a random access procedure according to one embodiment of the present invention.

FIG. 7 indicates an example of a random access procedure according to one embodiment of the present invention.

Similar to the aforementioned Formula 1, assume a procedure depicted in FIG. 7 is a procedure after a cell is selected in accordance with cell selection criteria defined by a general LTE system.

Referring to FIG. 7, in order to establish a connection with a current cell selected by a method of a general rank calculation, if a random access response is not received [S702] until a T300 timer expires [S705] after the timer is triggered by a random access [S701] or if a message 4 (RrcConnectionSetup) is not received [S703], a cell reselection parameter (i.e., Qhyst, Qoffset, Treselection) determined by a network is changed to a different value [S706].

In case of applying 0 as an example of the different value, Formula 1 can be modified to Formula 2 as follows.

$$Rs = Q\text{meas},s$$

$$Rn = Q\text{meas},n \quad \text{[Formula 2]}$$

If the Formula 1 is modified to the Formula 2, when a cell is reselected, a weighting or a penalty is not given to cells to determine a rank of a current cell (or, a serving cell) and a surrounding cell and a user equipment just determines the rank of cells in a manner of considering signal quality of each cell. Hence, since the user equipment will select a cell of best signal quality, success rate of a random access procedure may be enhanced. And, since a first cell reselection follows a conventional scheme and if a user equipment fails in a random access for a cell selected by the conventional scheme, the user equipment performs a cell reselection according to the modified Formula, unnecessary ping pong can be avoided as well.

Of course, the procedure depicted in FIG. 7 and the Formula 2 are just exemplary. The present invention may be non-limited to this and may change a cell reselection condition only if a random access is failed in a predetermined number. And, the cell reselection parameter (i.e., Qhyst, Qoffset, and Treselection) can be modified into not 0 but a value less than a value determined by a network, if necessary.

Structure of User Equipment and Base Station

In the following description, as a different embodiment of the present invention, a user equipment and a base station capable of performing the aforementioned embodiments of the present invention are explained.

A user equipment operates as a transmitter in UL and operates as a receiver in DL. And, a base station operates as a receiver in UL and operates as a transmitter in DL. In particular, the user equipment and the base station can include a transmitter and a receiver to transmit information or data.

The transmitter and the receiver can include a processor, a module, a part and/or a means, and the like to perform embodiments of the present invention. In particular, the transmitter and the receiver can include a module (means) configured to encrypt a message, a module configured to interpret an encrypted message, an antenna configured to receive a radio signal, and the like. An example of a transmitting end and a receiving end is explained with reference to FIG. 8.

Figure 8:
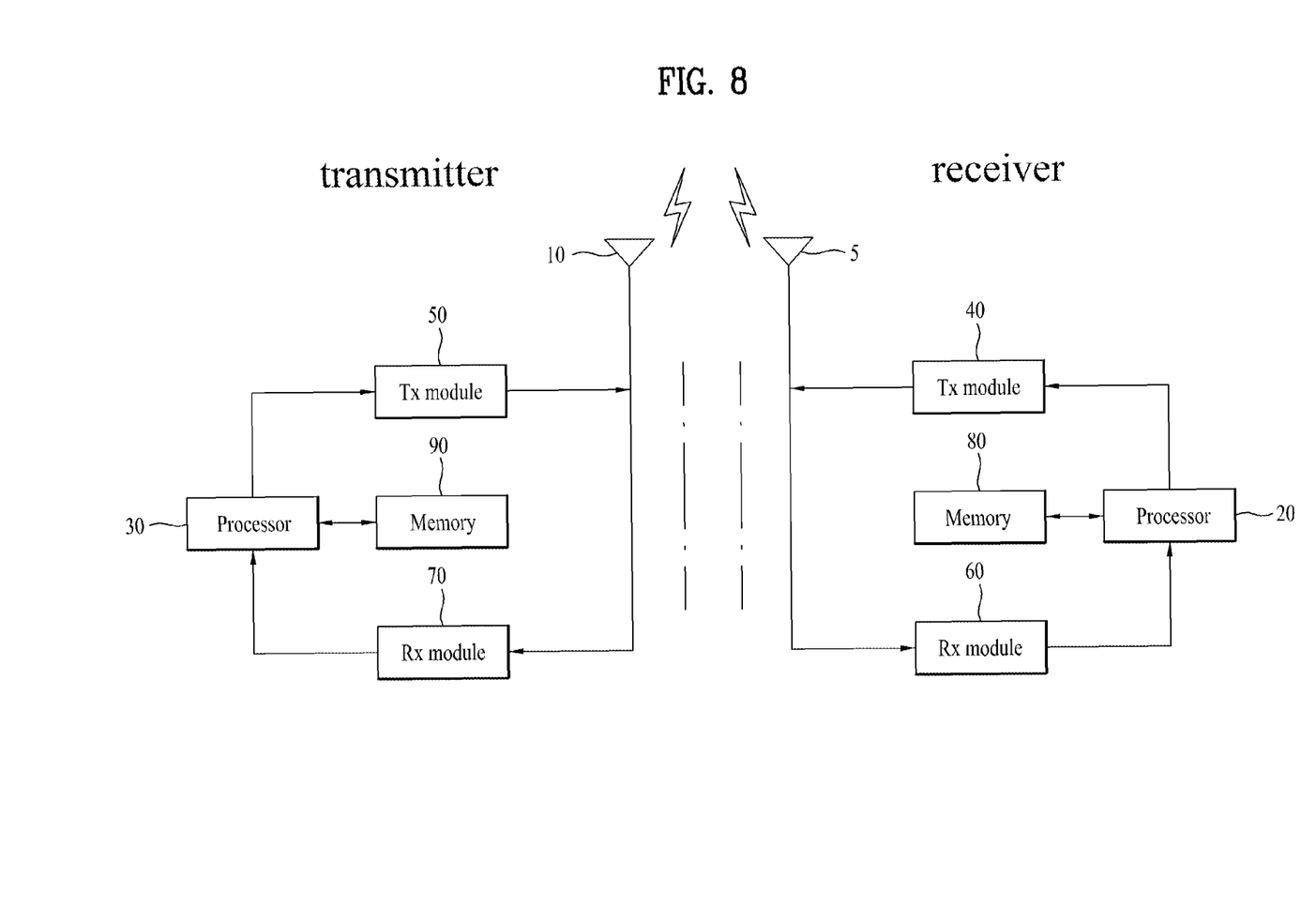
FIG. 8 is a block diagram for an example of a structure of a transmitting end and a receiving end as a different embodiment of the present invention.

FIG. 8 is a block diagram for an example of a structure of a transmitting end and a receiving end as a different embodiment of the present invention.

Referring to FIG. 8, the left part indicates a structure of a transmitting end and the right part indicates a structure of a receiving end. Each of the transmitting end and the receiving end can include an antenna 5/10, a processor 20/30, a transmitting module (Tx module) 40/50, a receiving module (Rx module) 60/70, and a memory 80/90. Each configuration element can perform a function corresponding to each other. In the following description, each configuration element is described in more detail.

The antenna 5/10 performs a function of transmitting a signal generated in the transmitting module 40/50 to an external or a function of receiving a signal from an external and delivering the signal to the receiving module 60/70. If multi antenna (MIMO) function is supported, at least two antennas can be installed.

A radio communication (RF) module can consist of the antenna, the transmitting module, and the receiving module.

In general, the processor 20/30 is configured to control overall operations of the receiving end and the transmitting end. For instance, the processor can perform a controller function to perform the aforementioned embodiments of the present invention, a MAC (medium access control) frame variable control function according to a service property and a propagation environment, a handover function, an authentication and encryption function, and the like.

In particular, the processor of the user equipment is configured to determine whether a cell selection (reselection) condition is satisfied and if the condition is satisfied, the processor is configured to perform a cell selection (reselection) procedure. In this case, if a cell is initially selected, a rank of a current cell (or, a serving cell) and a surrounding cell can be determined according to a general condition. Subsequently, the processor can perform a random access procedure by controlling the radio communication (RF) module. Yet, if a random access procedure is not successfully completed until a T300 timer, which is triggered when the random access procedure is initiated, expires, the processor is configured to perform a cell reselection. In this case, in determining a rank of cells, the processor can perform the cell reselection not using a value determined by a network but using (i.e., modifying a cell selection condition) a value determined for a case that a random access is failed. Subsequently, the processor can initiate the random access procedure to a cell selected as a result of reselecting.

Besides, the processor of the user equipment may be able to perform overall control operations of the operating process disclosed in the above-mentioned embodiments.

The transmitting module 40/50 performs prescribed coding and modulation on a data, which is scheduled by the processor and will be then transmitted externally, and is then able to deliver the coded and modulated data to the antenna 10.

The receiving module 60/70 reconstructs the radio signal received externally via the antenna 5/10 into original data in a manner of performing decoding and demodulation on the radio signal received via the antenna 5/10 and is then able to deliver the reconstructed original data to the processor 20/30.

The memory 80/90 can store programs for processing and control of the processor 20/30 and is able to perform a function of temporarily storing input/output data. And, the memory 80/90 can include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

Meanwhile, the base station may perform a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like using at least one of the modules mentioned in the foregoing description and may further include means, modules, parts and/or the like to perform these functions.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the present invention can be used for a terminal of a wireless mobile communication system, a base station, or other different devices. Specifically, the present invention can be applied to a method of performing a cell reselection and an apparatus therefor.

What is claimed is:

1. A method of performing a cell reselection at a user equipment in a wireless access system, the method comprising:
    determining a first rank of cells by:
        giving a prescribed weighting on a signal quality of a serving cell currently connected or attempting to connect to the user equipment, and
        giving a prescribed penalty on a signal quality of a cell other than the serving cell:
    selecting a first cell based on the first rank of cells;
    transmitting a random access preamble to the selected first cell;
    starting a timer when the random access preamble is transmitted; and
    if a response to the random access preamble is not received before the timer expires:
        determining a second rank of cells without considering the prescribed weighting or the prescribed penalty;
        selecting a second cell based on the second rank of cells; and
        transmitting a random access preamble to the selected second cell.

2. The method of claim 1, wherein a value of the prescribed weighting and a value of the prescribed penalty correspond to 0 when the second rank of cells is determined.

3. The method of claim 1, wherein the timer corresponds to a T300 timer, which has defined a limit time for completing the random access procedure.

4. A user equipment performing a cell reselection in a wireless access system, comprising:
    a radio communication (RF) device; and
    a processor operatively connected to the RF device and configured to:
        determine a first rank of cells by:
            give a prescribed weighting on a signal quality of a serving cell currently connected or attempting to connect to the user equipment, and
            give a prescribed penalty on a signal quality of a cell other than the serving cell:
        select a first cell based on the first rank of cells:
        transmit a random access preamble to the selected first cell;
        start a timer when the random access preamble is transmitted; and
        if a response to the random access preamble is not received before the timer expires:
            determine a second rank of cells without considering the prescribed weighting or the prescribed penalty:
            select a second cell based on the second rank of cells: and
            transmit a random access preamble to the selected second cell.

5. The user equipment of claim 4, wherein a value of the prescribed weighting and a value of the prescribed penalty correspond to 0 when the second rank of cells is determined.

6. The user equipment of claim 4, wherein the timer corresponds to a T300 timer, which has defined a limit time for completing the random access procedure.

* * * * *